United States Patent
Rieth (10) Patent No.: US 7,713,005 B2
(45) Date of Patent: May 11, 2010

(54) MILLING HEAD FOR MILLING CHAMFERS

(76) Inventor: Stephan Rieth, Weimarer Strasse 12, D-66606, St. Wendel (DE)

( * ) Notice: Subject to any disclaimer, the term of this patent is extended or adjusted under 35 U.S.C. 154(b) by 504 days.

(21) Appl. No.: 10/594,956

(22) PCT Filed: Mar. 30, 2005

(86) PCT No.: PCT/DE2005/000592
§ 371 (c)(1), (2), (4) Date: Sep. 29, 2006

(87) PCT Pub. No.: WO2005/095038
PCT Pub. Date: Oct. 13, 2005

(65) Prior Publication Data
US 2008/0240870 A1   Oct. 2, 2008

(30) Foreign Application Priority Data

Mar. 31, 2004 (DE) .................. 10 2004 016 566
May 11, 2004 (DE) .................. 10 2004 023 743

(51) Int. Cl.
*B23C 5/00* (2006.01)
*B23C 5/20* (2006.01)
(52) U.S. Cl. .................................. 407/66; 407/113
(58) Field of Classification Search .......... 407/66, 407/67, 41, 25, 36, 42, 61
See application file for complete search history.

(56) References Cited

U.S. PATENT DOCUMENTS

| 3,545,318 | A | * | 12/1970 | Anderson | ........... 82/158 |
| 4,293,254 | A | | 10/1981 | Markovics et al. | |
| 5,913,643 | A | | 6/1999 | Fowler et al. | |
| 7,252,460 | B2 | * | 8/2007 | Rieth | ........... 407/113 |

FOREIGN PATENT DOCUMENTS

DE    37 30 943    4/1989

* cited by examiner

*Primary Examiner*—Will Fridie, Jr.
(74) *Attorney, Agent, or Firm*—Friedrich Kueffner (57) ABSTRACT

The invention relates to a milling head for milling chamfers, especially for a mobile chamfer miller, comprising successive seats for blanking dies, said seats having a position in which the blanking dies with a leading edge angle of between 40 and 75° operate respectively on average with a positive effective cutting angle of at least 6° and a clearance angle of at least 6°, and are provided for a border comprising blanking dies with a staggered arrangement of the cutting edges, such that respectively only one cutting edge length of 15 mm, preferably 12 mm, at the most, is active. Said measures increase the cutting performance of the milling head. The reduced cutting edge length can be formed on a long blanking die instead of using a shorter blanking die, in such a way that the cutting edge is interrupted by cavities or other e.g. flat triangular recesses on the surface of the blanking die. The staggered arrangement is then comparatively small.

12 Claims, 9 Drawing Sheets

MILLING HEAD FOR MILLING CHAMFERS

BACKGROUND OF THE INVENTION

1. Field of the Invention

The invention relates to a milling head for milling chamfers, in particular for a mobile chamfer mill, with successive seats for cutting dies.

2. Description of the Related Art

Chamfers have to be milled to a great extent on components in order to prepare V- or X-weld seams, and visible or protective chamfers. The chamfers may lie on straight edges or on curved contour profiles. Straight edges can be machined by means of cylindrical milling heads. Curved contour profiles require conical milling heads. Since the width of the chamfers required is, as a rule, at most 50 mm, work can be carried out with cutting dies of such a length.

SUMMARY OF THE INVENTION

The object on which the invention is based is to increase the cutting power of the milling head.

According to the invention, this purpose is achieved in that the seats have a position in which the cutting dies which have a wedge angle of 40-75°, operate on average with a positive rake angle of at least 6° and with a clearance angle of at least 6°, and, for a fitting with cutting dies in an offset arrangement of the cutting edges, are configured in such a way that only one cutting edge length, which amounts at most to 70% of the overall cutting edge length required according to the chamfer width, is effective.

The first measure results in favorable conditions for the penetration of the cutting dies into the material. The cutting dies cut in relatively sharply. The second measure is based on the recognition that, irrespective of the possibility of covering the entire chamfer width with one cutting die having a correspondingly long cutting edge, a division into smaller cutting edges arranged so as to be offset one behind the other is the better solution, specifically, even when the overall length of all the cutting edges on the milling head becomes smaller than 30 mm. The shorter cutting edge requires less pressure force and allows a more rapid advance of the milling head. This advantage has an effect particularly in the case of mobile chamfer mills.

The shortened cutting edge length may be provided, instead of on a shorter cutting die, on a long cutting die, specifically if the cutting edge is interrupted by depressions or other, flat-triangular recesses on the surface of the cutting die. The required offset is then only comparatively small. The long cutting die has a correspondingly good seat.

The measures may be taken on a conical or on a cylindrical milling head.

The above particulars relating to the minimum rake angle and minimum clearance angle refer to a conical milling head, and, "on average", the two angles vary here with the radius of the milling head. The indication regarding the wedge angle relates to the basic design of the cutting die without an additional groove directly at the cutting edge.

As a rule, the effective cutting edge will be no longer than 12 mm, at most 15 mm.

A better space utilization is possible on conical milling heads because of the offset arrangement. The seats may be arranged in two coaxial rows, of which the outer row has twice as many seats as the inner row.

However, seat designs may also extend over the entire generatrix of the conical or cylindrical milling head and may have different seats for the cutting dies, for example using differently arranged threaded bores for a fastening screw of the cutting die. Instead, particularly in the case of long cutting dies with an interrupted cutting edge, different dies arranged on identical seats or identical dies with different cutting edges on their various sides would also be possible, so that, with a succession of different dies or by an alternating lateral orientation of the same dies, the cutting edges can be arranged so as to be offset. Offset possibilities could also be afforded by somewhat eccentric bores in the dies for the fastening screws.

It would be appreciated that, in the former case, too, all the seats are arranged on another generatrix of the milling head, so that, as far as possible, only one cutting edge is in engagement at one time, and that, in the offsets, overlaps remain which cause no burrs and/or remove burrs which have occurred.

Since, in the arrangement according to the invention, the cutting dies must penetrate into the material at least at one end of the cutting edge, the cutting edge or cutting edges should always be angled obliquely at their ends by means of a chamfer of the cutting die. The angling should extend at least over the depth of penetration of the cutting die.

The cutting power can be increased even further by means of the advantageous refinements of the invention which are described below:

The seats are preferably arranged such that the cutting edges are oriented obliquely at a small angle with respect to the generatrix of the milling head. Consequently, the cutting edges penetrate into the material, commencing on one side and not abruptly over their entire length at the same time. The run of the milling head becomes smoother.

When the cutting dies are arranged with their center axis on a generatrix of a conical milling head, such an oblique position is to some extent obtained automatically. However, it may be further reinforced by setting the center axis of the cutting die somewhat obliquely.

On a cylindrical milling head, the center axis of the cutting die must always be set obliquely when the cutting edge is to be oriented obliquely.

The cutting dies are to be designed as reversible dies and, parallelepiped-shaped with two wide sides, and the seats are to have a bearing surface for one wide side and a supporting surface for transmitting the thrust force on a narrow side, or vice versa, and the reversible dies are to have, on the side facing away from the supporting surface, a groove forming two faces which, with the exception of any indentations and/or protuberances of their margins forming the cutting edges, have a continuously uniform cross section mirror-symmetrical with respect to the center plane of the reversible die, the two faces being planar and preferably being at an angle of 80 to 150° to one another or being concave correspondingly to a groove of round cross section. Owing to the groove, the chips are discharged quickly in an arc in such a way that they do not impede the progressive cut.

Finally, in production terms, it is particularly advantageous to have the refinement where the seats are arranged in two coaxial rows on a conical or cylindrical milling head and the milling head is composed of two segments each having one of the rows.

During the aggressive engagement of the cutting dies which takes place according to the invention, the milling head of the mobile chamfer mill must be held and guided particularly firmly and reliably if an exact uniform chamfer is to occur. Said milling head is therefore preferably provided with a guide mounted in its vicinity on the respective machine and taking the form of stops which are assigned to the two surfaces of the workpiece which delimit the chamfer.

Where a cylindrical milling head is concerned, the stops may be sliding strips or strips provided with rollers, or the like.

Where a conical milling head is concerned, preferably one stop is a disk axially displaceable and fixable in respect to the milling head and the other stop is a freely rotatable roller which preferably has only a narrow annular stop surface at its axial end facing the milling head.

The drawings show exemplary embodiments of the invention.

Figure 1:
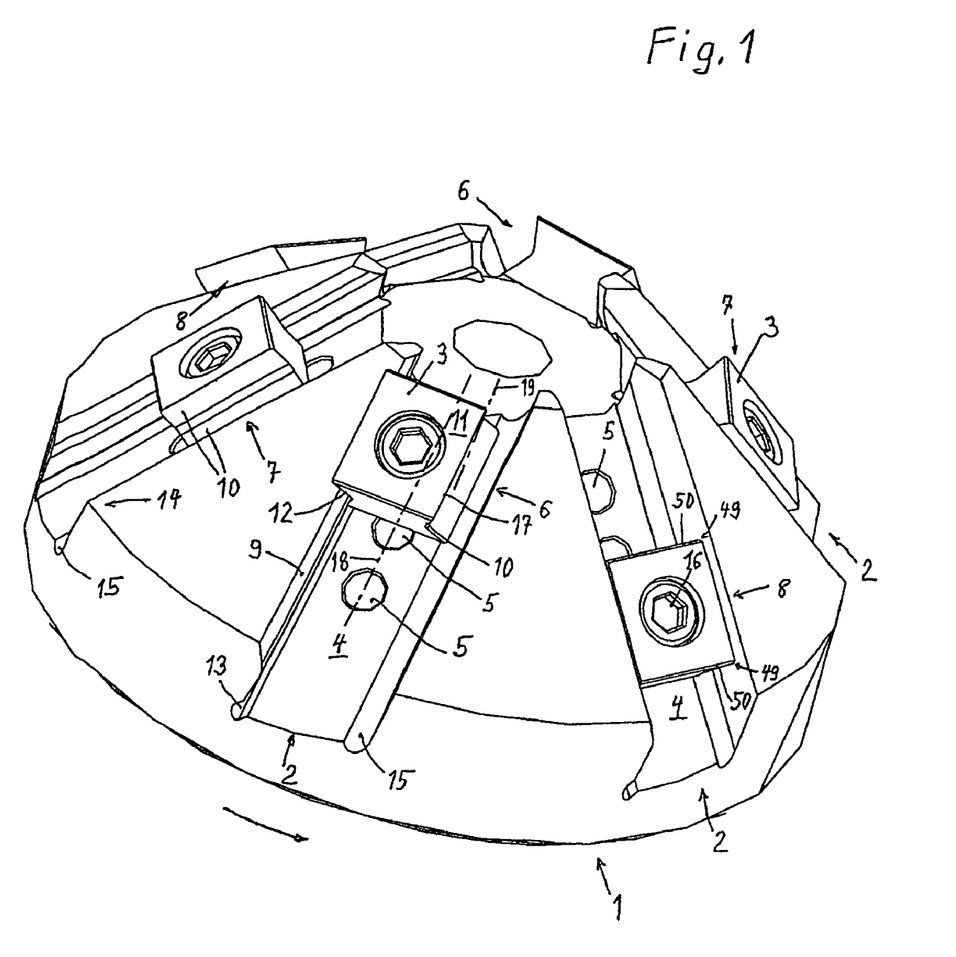
FIG. 1 shows a first milling head in an isometric illustration.

FIG. 1 shows a conical milling head 1 with six seat designs 2 for a reversible die 3.

The seat designs 2 comprise in each case a bearing surface 4 for one wide side of the on the generally parallelepipedal reversible die 3, three threaded bores 5, to be used selectively, for a screw 16, by means of which the reversible dies 3 are to be fastened on their seat 6, 7 or 8, and a supporting surface 9, against which the possible face 12 lying opposite the current face 10 on the flank 11 comes to bear.

A narrow free space 13 extends from the supporting surface 9 along the adjoining possible face and around its cutting edge.

On the other side, the reversible die 3 lies freely against a setback 14 and a cut-out 15 of the milling head 1.

The milling head 1 is thus far disclosed in the unpublished DE 103 20 173 to which reference may additionally be made.

The faces 10 and 12 are formed by approximately V-shaped slots introduced into the respective narrow sides of the reversible dies 3. These slots are symmetrical with respect to the die center plane parallel to the flank 11. Overall, therefore, the reversible dies 3 may have four cutting edges formed by the two V-slots.

The seats 6, 7 and 8, which receive the reversible dies 3 as a result of the fastening of these in the front, middle and rear threaded bore 5, are offset. They overlap one another, however, so that no burrs occur. Only the 10 mm long cutting edge 7 of a reversible die 3 is ever in engagement in the material. In view of the fact that the cutting edge also has to penetrate into the material at least at one end, it is angled obliquely at 49 at the ends. The obliquity is generated by chamfers 50 of the cutting die.

Since the seat designs 2 lie on a generatrix 18 of the conical milling head and the cutting edge 17 runs 15 parallel to this generatrix, the cutting edge 17 is oriented slightly obliquely with respect to the generatrix 19 present at its end.

Figure 2:
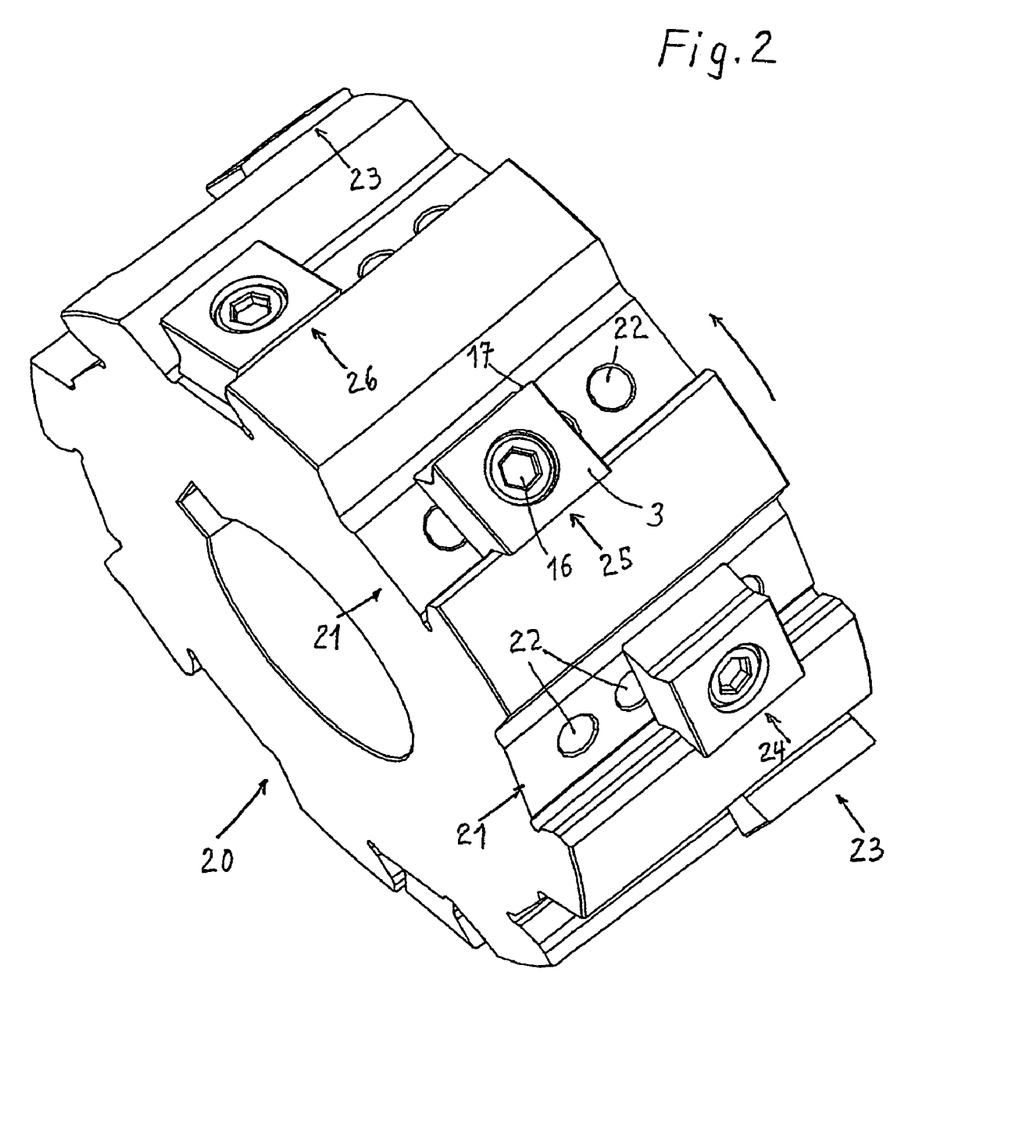
FIG. 2 shows a second milling head in an isometric illustration.

In FIG. 2, the conditions of FIG. 1 are transferred to a cylindrical milling head 20.

Eight seat designs 21, each for a reversible die 3, are formed on the cylinder casing. They each have four threaded bores 22. They are identical in cross section to the seat designs 2. The reversible dies 3 occupy four different seats 23, 24, 25 and 26 offset relative to one another.

Figure 3:
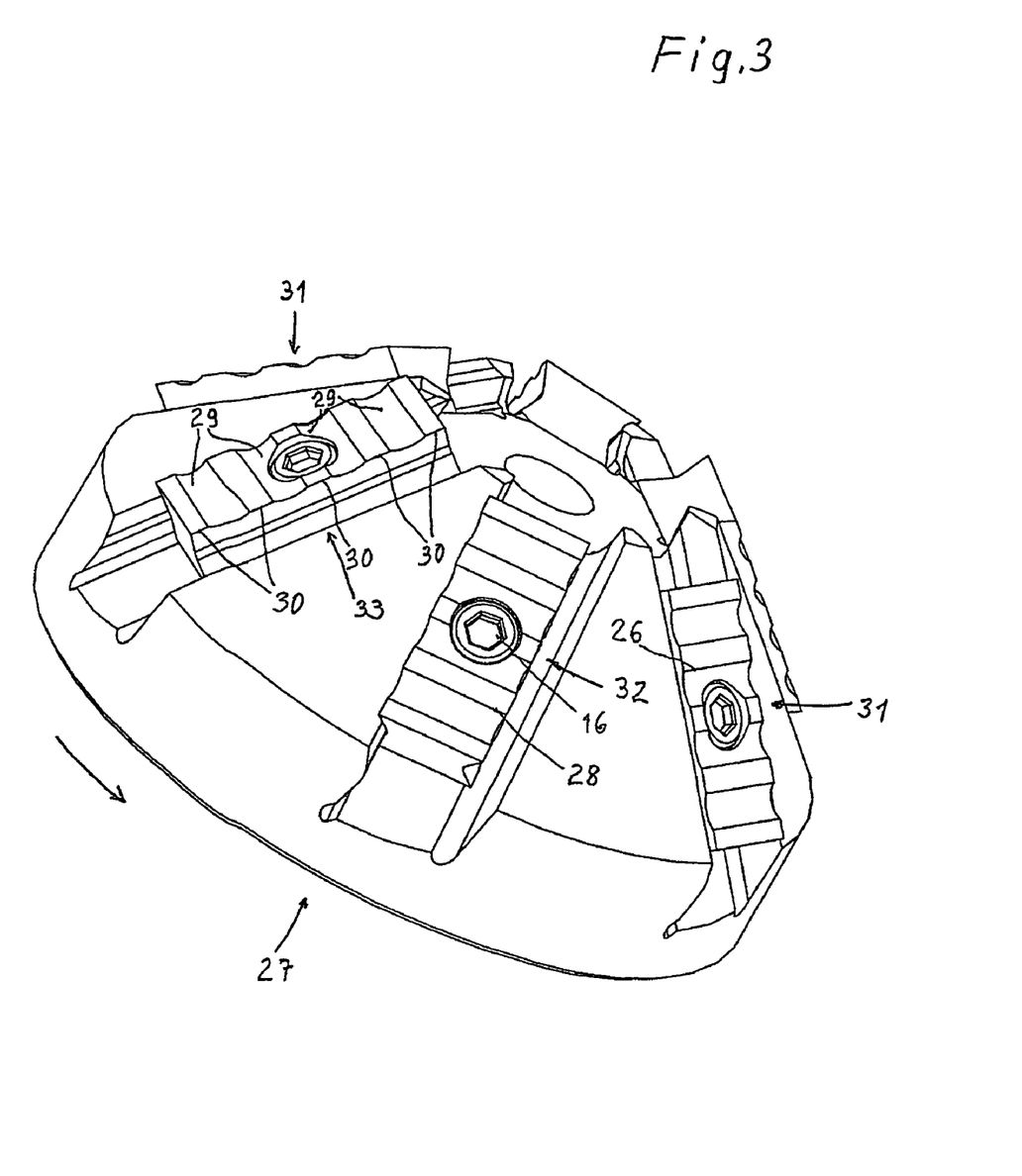
FIG. 3 shows a third milling head in an isometric illustration.

In FIG. 3, six differently configured reversible dies 28 are mounted on the same conical milling head 27 as in FIG. 1, with the exception of the threaded bores. The reversible dies 28 have essentially the same cross section as the reversible dies 3, but more than twice the length. In this case, however, their cutting edges are interrupted by depressions 29 on the wide sides of the reversible dies 28, so that they engage into the material and can thus become effective on portions 30 only. The reversible dies 28 therefore need to be offset only by an amount such that the portions 30 are offset. Under these circumstances, only one threaded bore, correspondingly offset slightly from seat to seat, is present for a screw 16. Three different seats 31, 32 and 33 are set up.

The overall length of the portions 30 is only 10 mm. The reversible dies 28 are held particularly firmly over their greater length, thus resulting in high stability and smooth running.

Figure 4:
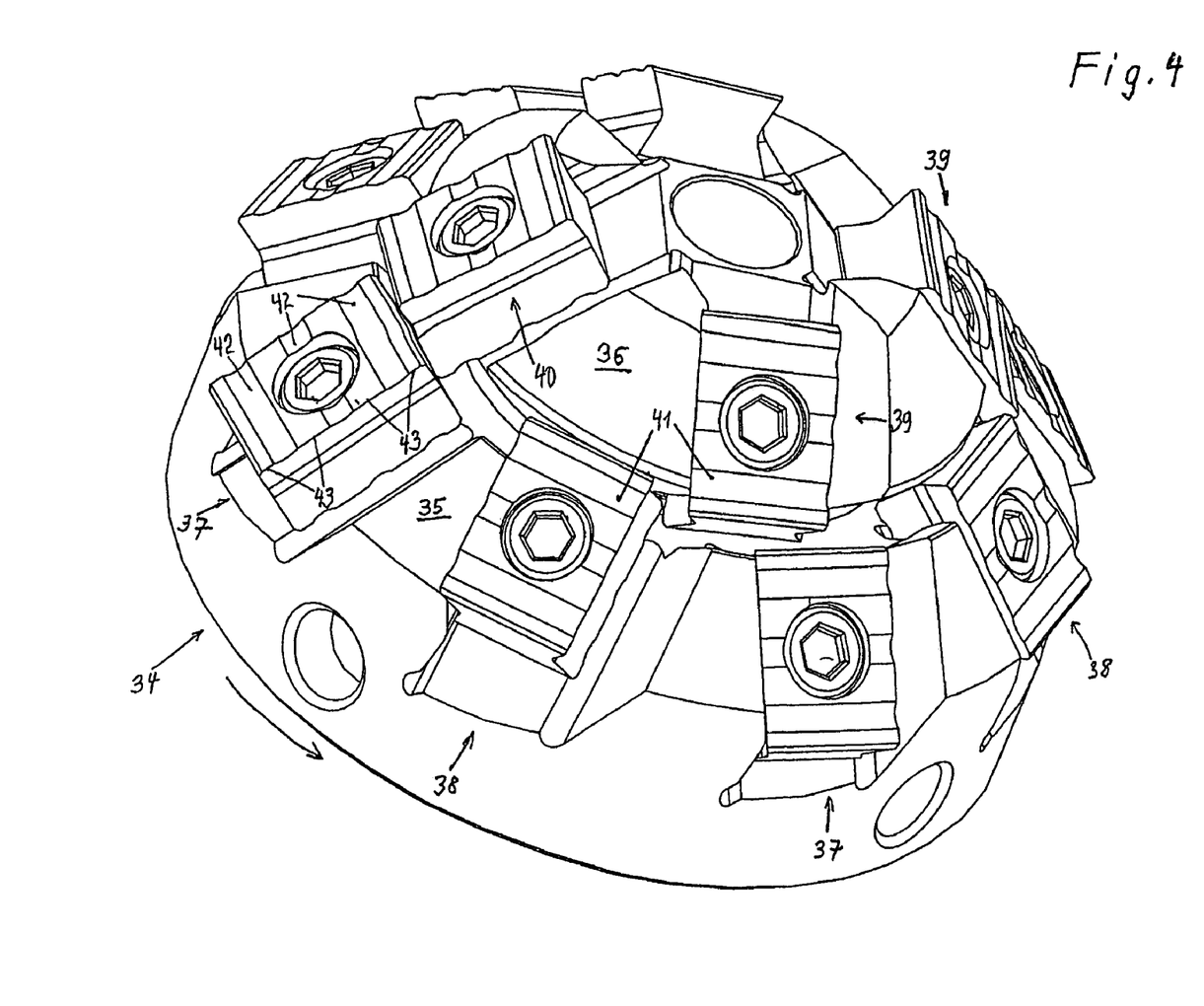
FIG. 4 shows a fourth milling head in an isometric illustration.

The conical milling head 34 in FIG. 4 consists of two segments 35 and 36 connected to one another, for example, by screwing or shrink fitting. Eight seats 37, 38 are formed on the outer segment 35 and four seats 39, 40 are formed on the inner segment 36. The seats 38 and 40 are offset with respect to the seats 37 and 39. The seats 39 and 40 are arranged, as to be staggered, between the seats 37 and 38. The reversible dies on the seats 38 remove the burr occurring between the two preceding reversible dies (seats 37, 39 and 37, 40).

The reversible dies, designated by 41, have, in principle, the same design as the reversible dies 28. However, they are shorter and have only three depressions 42 instead of four and, correspondingly, four cutting edge portions 43 instead of five.

Figure 5:
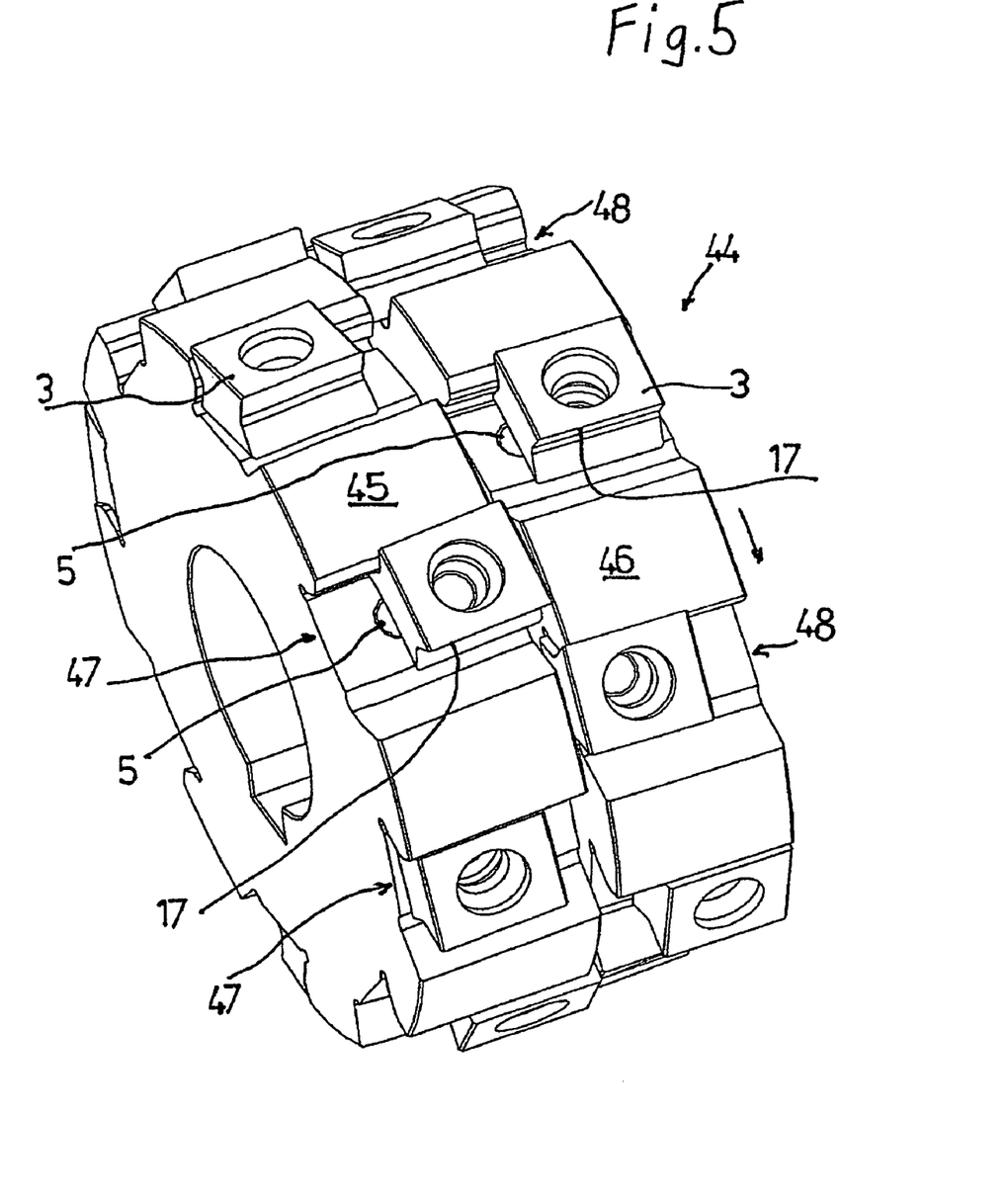
FIG. 5 shows a fifth milling head in an isometric illustration.

In FIG. 5, a cylindrical milling head 44 consists of two segments 45 and 46 screwed to one another. In each case eight seat designs 47 and 48 are formed on the two segments 45 and 46. The reversible dies 3 are fastened alternately, using one threaded bore 5 and the other. In this case, every second reversible die 3 projects slightly onto the other segment 45 and 46, so that no burr occurs here.

The seat designs 47 and 48 are oriented slightly obliquely with respect to the generatrices of the cylindrical milling head, specifically the seat designs 48 in the opposite direction to the seat designs 47.

Moreover, on all the milling heads I, 20, 27, 34 and 44 described, the seats are set such that the rake angle and the clearance angle in each case amount to about 12° (on average in the case of the conical milling heads 1, 27 and 34).

When chamfers are to be milled, the width of which is smaller than the cutting edge length, the offset may be dispensed with if the same milling heads are used.

Figure 6:
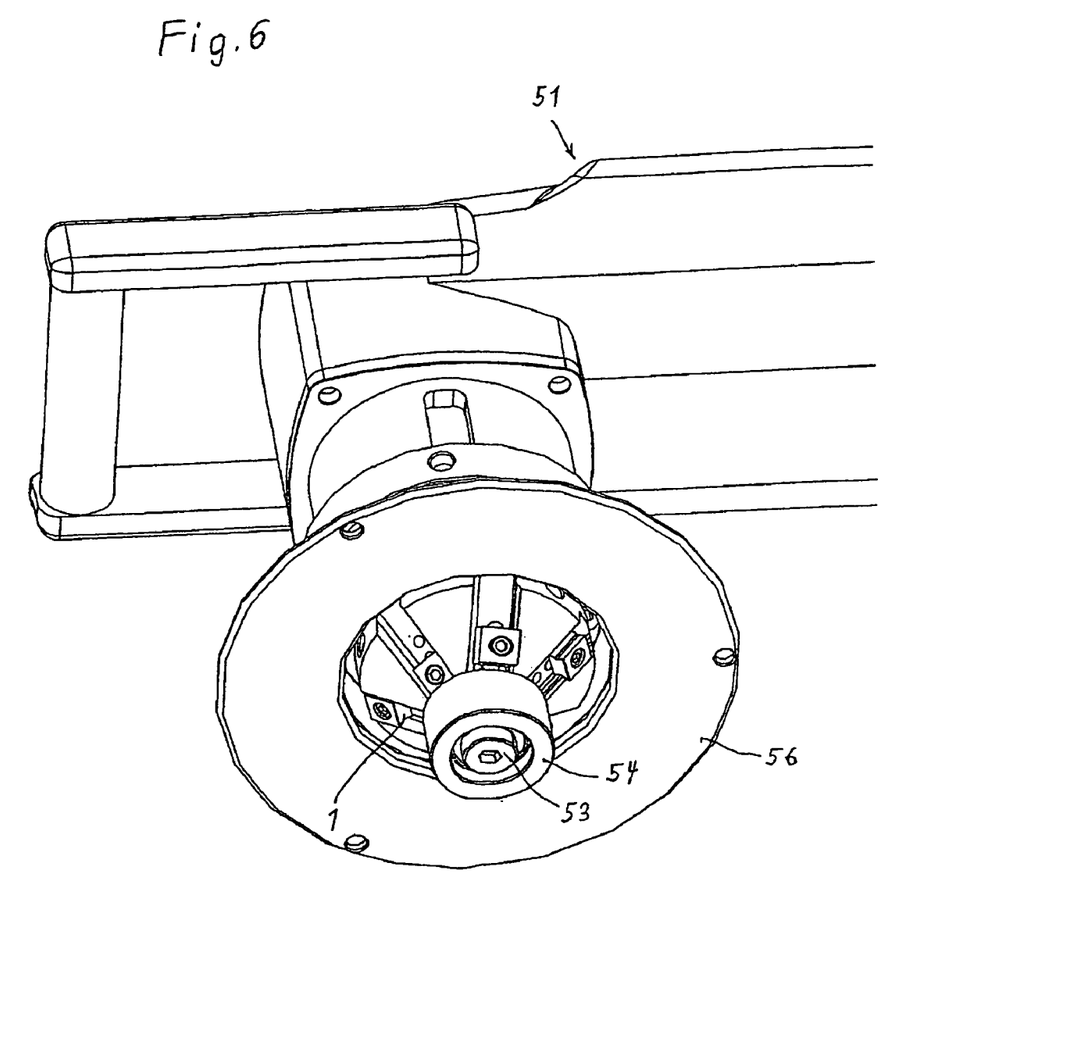
FIG. 6 shows the milling head according to FIG. 1 on a milling machine and with a guide.

In FIG. 6, the milling head 1 is mounted on a hand-operated milling machine 51. It is mounted fixedly to the rotation on the output shaft of the hand-operated milling machine 51, said output shaft otherwise being surrounded by a cylindrical sleeve 52.

A freely rotatable roller 54 is attached via a ball bearing 53 to that end of the output shaft which projects from the milling head 1.

A cuff 55, as a holder for an annular disk 56, is seated on the sleeve 52 axially displaceably, but in this case fixedly in terms of rotation, and so as to be capable of being fixed in various axial positions.

Figure 7:
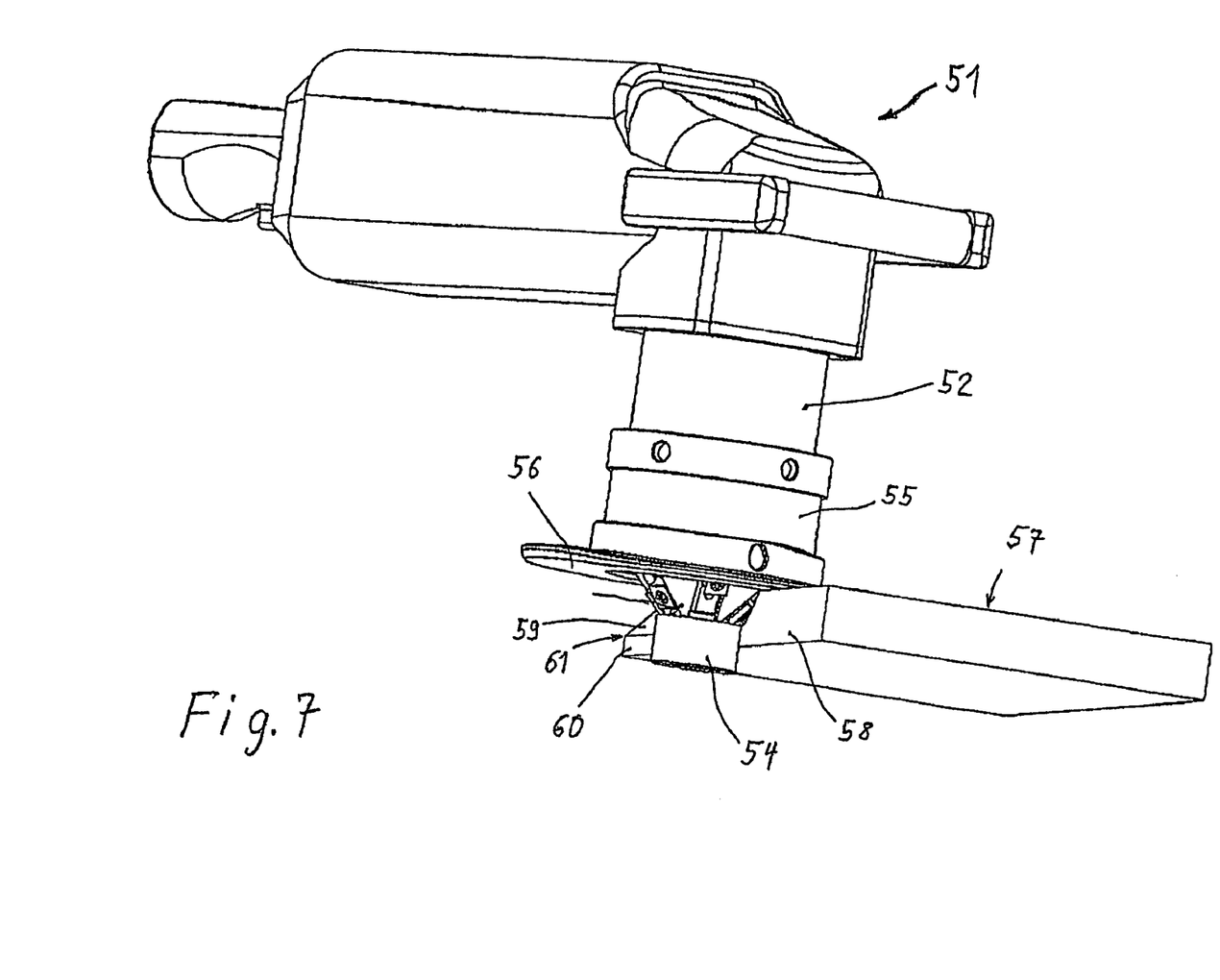
FIG. 7 shows the arrangement according to FIG. 6 in engagement on a workpiece.

The disk 56 and the roller 54 are assigned, in the way evident from FIG. 7, as stops to the surface 57 or the lateral surface 58 of the workpiece and thus form a guide. The roller 54 in this case bears against the residual surface 60, remaining after the milling of the chamfer 59, of the lateral surface 58. It is preferably slightly conical or is provided at its upper end with a flat collar, so that it touches only a narrow strip along the edge 61 between the chamfer 59 and residual surface 60. This avoids errors which could be caused by oblique positions of the residual surface 60 or by a burr on the lower edge of the latter.

It will be appreciated that the axis of the milling head 1 is oriented as far as possible perpendicularly with respect to the surface 57 of the workpiece.

Figure 8:
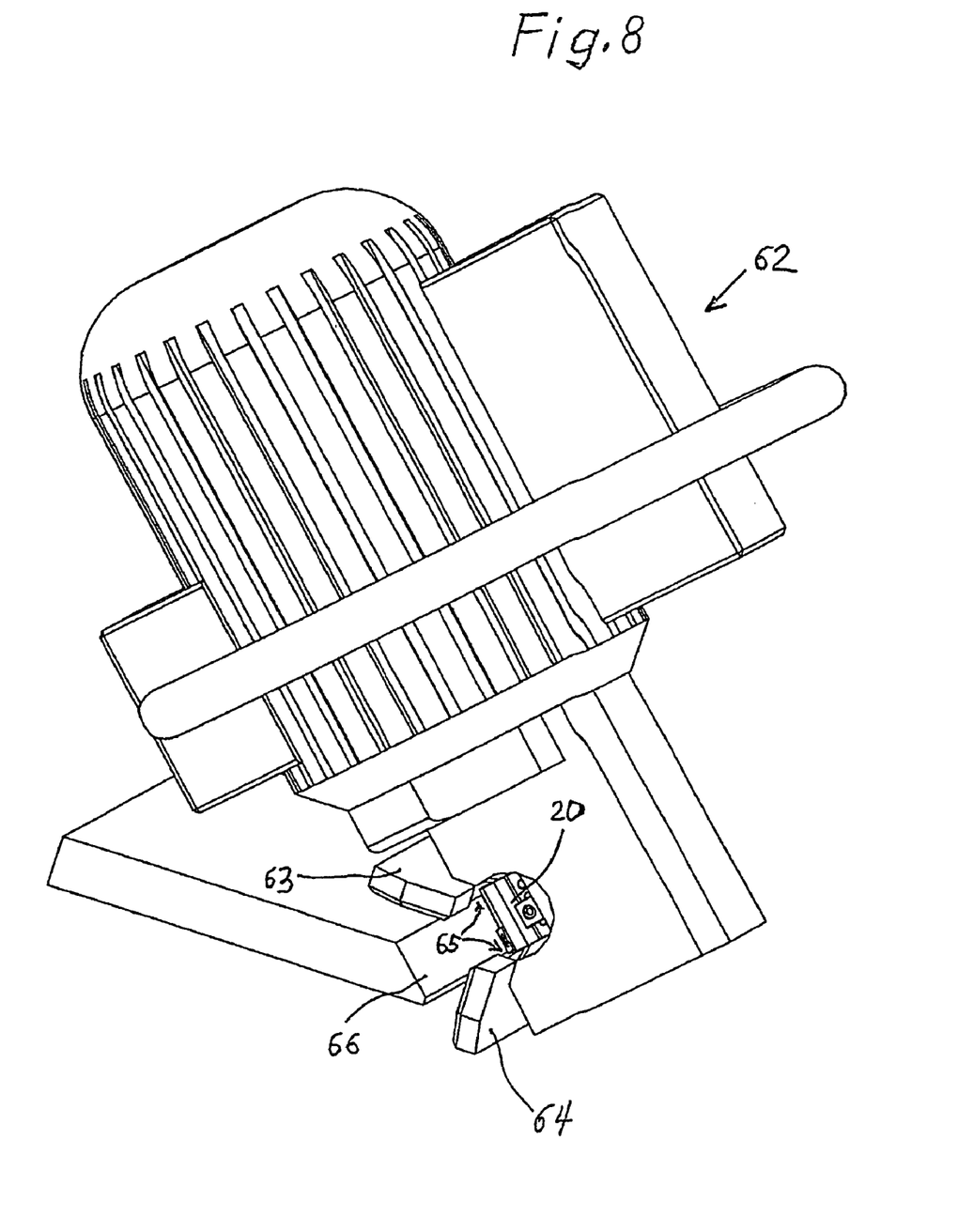
FIG. 8 shows the milling head according to FIG. 2 on a milling machine and with a guide in engagement on a workpiece.

In FIG. 8, the cylindrical milling head 20 sits on the output shaft of the hand-operated milling machine, designated by 62.

Two strips 63 and 64 are provided as stops forming a guide. The milling head 20 projects with its axial end into indentations 65 of the strips 63 and 64. The strips 63 and 64 are connected firmly to the housing of the hand-operated milling machine 62. They can be brought into various angular positions correspondingly to the angular position of the chamfer, designated here by 66.

Figure 9:
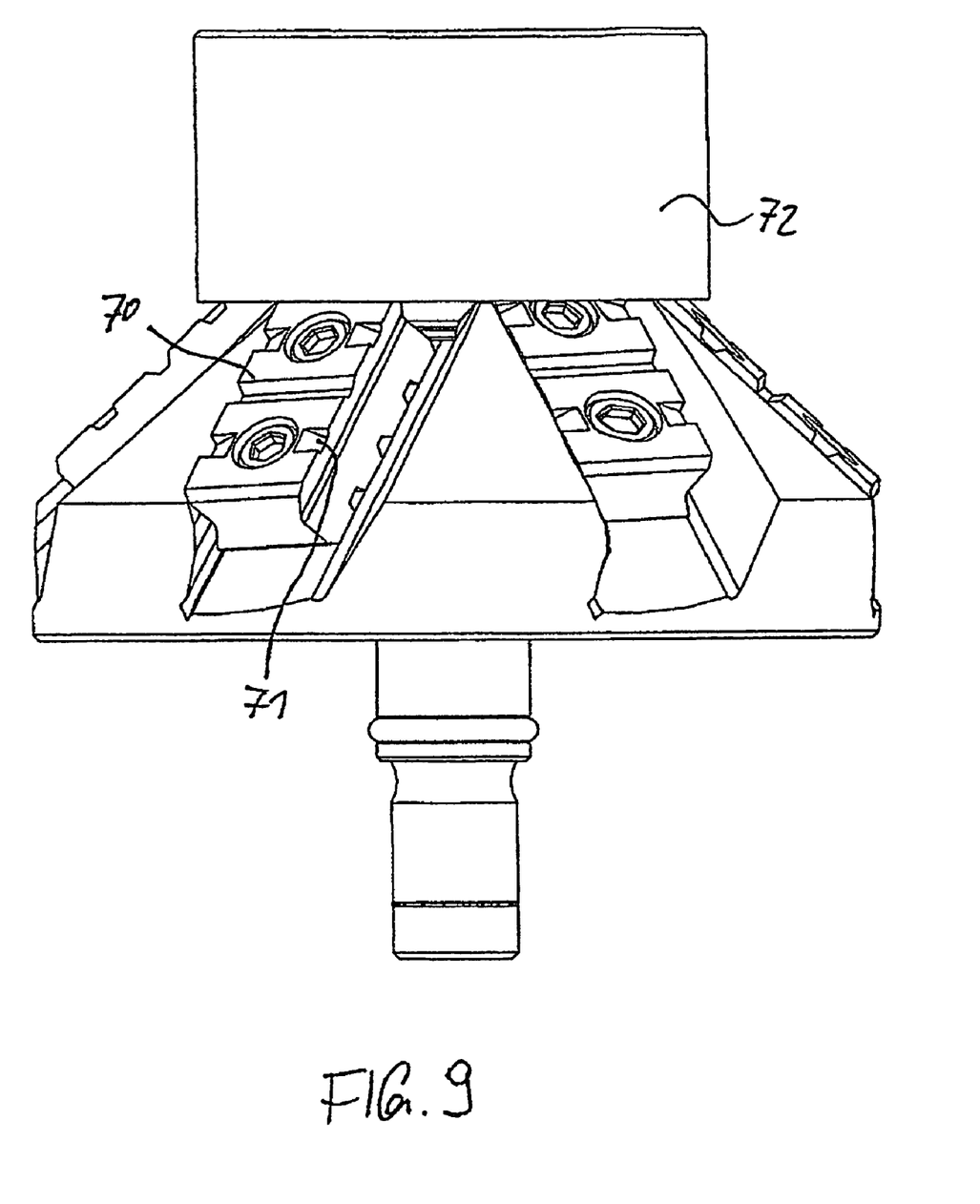
FIG. 9 shows a further milling head in an isometric illustration.

FIG. 9 shows a further milling head similar to the milling head of FIG. 3. The cutting edges of reversible dies 70 here, however, are not interrupted solely by depressions extending continuously over the die width, but, inter alia, by marginal recesses 71 of trapezoidal cross section. A bore for fastening the reversible die 70 in its seat is provided between two marginal recesses 71 lying opposite one another. The milling head is connected to a guide bearing 72 forming a spacer piece.

Set-back minor cutting edges with a specific clearance angle could be formed by the marginal recesses 71. In the case of pronounced depths of penetration of the cutting edges, the minor cutting edges are employed. In the embodiment shown, with a "negative" clearance angle, the clearance angle surfaces are set up and thus limit a deeper penetration of the cutting edges. By suitable choice of the pocket depths and/or clearance angles, these effects, important particularly for hand-operated machines, can be set in a controlled way. The machine consequently does not catch when work starts. The edges of the marginal recesses are expediently rounded by means of brushes. Continuous depressions may serve as separating points in order to divide the reversible dies.

The invention claimed is:

1. A milling head for milling chamfers, the milling head comprising successively arranged seats (5) for cutting dies, wherein the seats (6-8; 23-26; 31-33; 37-40) are mounted in a position in which the cutting dies (3; 28; 31) provided, which have a wedge angle of 40-75° operate on average with a positive rake angle of at least 6° and with a clearance angle of at least 6°, and, for a fitting with cutting dies (3; 28; 41) in an offset arrangement of the cutting edges, the seats are mounted such that only one cutting edge length, which amounts at most to 70% of the overall cutting edge length required according to the chamfer width.

2. The milling head as claimed in claim 1, comprising an effective cutting edge length of the cutting dies (3; 28; 41) of at most 30 mm.

3. The milling head as claimed in claim 1, wherein the cutting (17) of each cutting dies (3) is angled obliquely (49) at its end by means of a chamfer (50) of the cutting die.

4. The milling head as claimed in claim 1, comprising an arrangement of the seats (47; 48) such that the cutting edges (17) are oriented obliquely at a small angle with respect to the generatrix of the milling head (44).

5. The milling head as claimed in claim 1, wherein the cutting dies are reversible dies (3; 28; 41) and are parallelepiped shaped with two wide sides, and the seats each have a bearing surface (4) on a wide side thereof and a supporting surface (9) for transmitting the thrust force, for a narrow side, or vice versa, and the reversible dies (3; 28; 41) have, on the side facing away from the supporting surface (9), a groove which forms two faces (10) and which, if appropriate with the exception of any indentations and/or protuberances of their margins forming the cutting edges, has a continuously uniform cross section mirror-symmetrical with respect to the center plane of the reversible die, the two faces (10) being planar and preferably being at an angle of 80 to 160° to one another or being concave correspondingly to a groove of round cross section.

6. The milling head as claimed in claim 1, wherein the reversible dies (28; 41) have on their wide sides recesses (29; 42) interrupting the cutting edge or cutting edges (30; 43).

7. The milling head as claimed in claim 1, wherein the seat (2; 21; 47; 48) extends over the entire generatrix of the conical or cylindrical milling head (1; 20; 44), and different seats (6-8; 23-26) for the cutting dies (3) have differently arranged threaded bores (5) for a fastening screw (16) of the cutting die (3).

8. The milling head as claimed in claim 1, wherein, on a conical or cylindrical milling head (34; 44), the seats (37-40; 47; 48) are arranged in two coaxial rows, and the milling head (34; 44) is composed of two segments (35; 36; 45; 46) in each case having one of the rows.

9. The milling head as claimed in claim 1, wherein, on a conical milling head (34), the seats (37-40) are arranged in two coaxial rows, and the outer row has twice as many seats (37; 38) as the inner row.

10. The milling head as claimed in claim 1, wherein it is provided with a guide mounted in its vicinity on the respective machine (51; 62) and taking the form of stops (54; 56; 63; 64) which are assigned to the two surfaces 57; 60) of the workpiece which delimit the chamfer (49; 66).

11. The milling head as claimed in claim 10, wherein, where a cylindrical milling head (2) is concerned, the stops are sliding strips (63; 64) or strips (63; 64) provided with rollers, or the like.

12. The milling head as claimed in claim 10, wherein, where a conical milling head (1) is concerned, one stop is a disk (56) preferably axially displaceable and fixable with respect to the milling head (1), and the other stop is a freely rotatable roller (54) which preferably has only a narrow annular stop surface at its axial end facing the milling head (1).

* * * * *